March 25, 1969 J. N. PEARSE 3,435,297
CAM-OPERATED RELAY SHIFT REGISTER
Filed Aug. 10, 1965
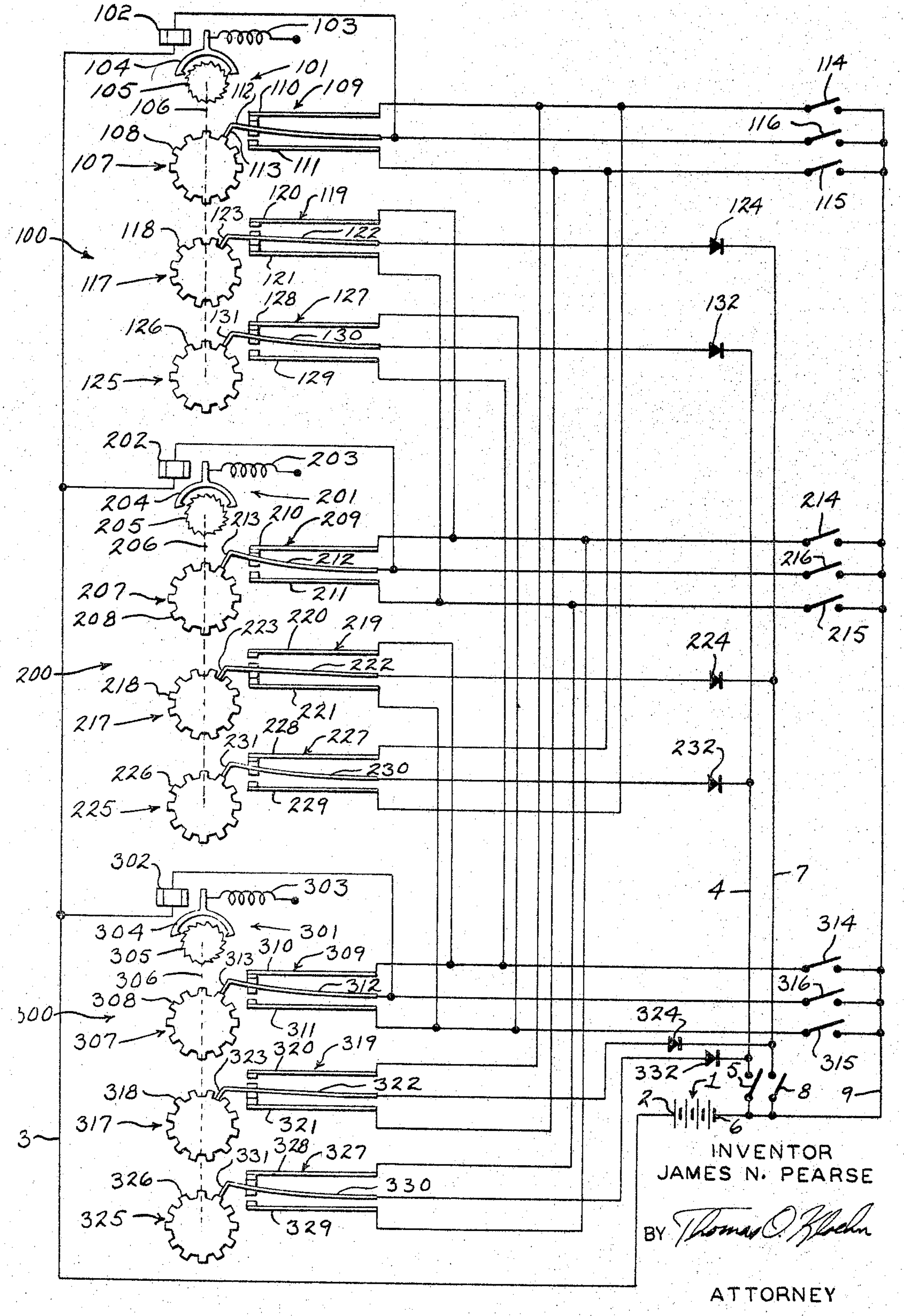
INVENTOR
JAMES N. PEARSE
BY Thomas O. Kloehn
ATTORNEY United States Patent Office 3,435,297
Patented Mar. 25, 1969

3,435,297

CAM-OPERATED RELAY SHIFT REGISTER

James N. Pearse, Menomonee Falls, Wis., assignor to Allen-Bradley Company, Milwaukee, Wis., a corporation of Wisconsin Filed Aug. 10, 1965, Ser. No. 478,669
Int. Cl. H01h 47/14
U.S. Cl. 317—139 8 Claims

ABSTRACT OF THE DISCLOSURE

The recirculating bidirectional shift register has three identical stages connected to an electrical source through an input switch, and set, reset and complement switches. Each stage employs a stepping, cam-operated relay in which a solenoid operated ratchet turns three cams on the trailing edge of an input signal. Each relay has three cams and each cam actuates the movable contact of a single-pole-double-throw contact. One set of contacts controls the input signal to its own relay solenoid. The other two sets of contacts transfer the signal in opposite directions to the control contacts of adjacent relays.

The present invention relates to shift registers, and more specifically the invention resides in a shift register that utilizes stepping cam operated relay modules that have at least one set of control contacts and that have at least one set of transfer contacts for each direction in which information is to be shifted, the control contacts being connected to control the operation of the modules and the transfer contacts being connected across the control contacts of the next adjacent module in the direction in which information is to be shifted to transfer information to that module.

A shift register according to the present invention is a device into which information, in the form of coded characters or numbers, may be read and stored, and which, upon command, will read out or perform various other operations upon that information. In some applications, it must be possible to read information into or out of the shift register serially, and sometimes parallel read-in or read-out is preferred. Often it is advantageous to cancel one bit of information in the shift register without disturbing other bits of information, or to circulate information continuously through the shift register, or to shift information backwards and forwards or in any number of directions.

The practical uses for such manipulation of information are manifold. This shift register has wide application, for example, in automatic warehousing, programmed or coded conveyor systems, controls for feeding mechanisms for machines, storing and recirculating programmed sequences for machines, and performing ordinary arithmetic operations in various control or computing systems. Versatility is of cardinal importance in any shift register, and a shift register of the present invention is manifestly preeminent in that capacity. Its inherent trailing edge, asynchronous operation renders it compatible with a very broad range of systems. Moreover, a shift register of the present invention is capable of simultaneously handling any number of bits of information and of simultaneously performing a wide variety of operations with the different bits of information, including set, reset and complement functions in each stage individually.

The primary objects and advantages may be summarized in the form of the list that follows:

To provide a highly versatile shift register;

To provide a shift register of large capacity;

To provide a shift register having inherently trailing edge logic, asynchronous operation;

To provide a shift register capable of producing any number of immediately usable output signals;

To provide a shift register capable of performing a broad range of sequencing operations;

To provide a shift register that may be complemented, set or reset at each stage;

To provide a shift register capable of shifting information in as many directions as desired;

To provide a shift register capable of simultaneously performing a variety of different operations on numerous bits of information;

To provide a shift register of great flexibility, versatility, stability and reliability.

The foregoing and other advantages will appear in the written description of the invention to follow. The written description will refer to the drawings containing one embodiment of the present invention and forming a part of the disclosure and is set forth in full, clear, concise and exact terms the manner and process of making and using the present invention so as to enable any person skilled in the art to which it pertains to make and use the invention. This disclosure also sets forth the best mode contemplated by the inventor of carrying out his invention, but the embodiment described is not to be confused with the subject matter of the invention, for many variations and permutations of the presently to be described embodiment may be made without departing from the subject matter of the present invention. Instead, this specification concludes with one or more claims which particularly point out and distinctly claim the subject matter which is regarded as the invention.

In the drawings:

The sole figure is a schematic diagram of a preferred embodiment of the present invention in the form of a bidirectional, recirculating shift register.

The preferred embodiment of the present invention selected here as a vehicle for describing the invention in such full, clear, concise and exact terms as to enable those skilled in the art to which it pertains to make use of the same, as well as to set forth the best mode contemplated by the inventor of carrying out his invention, is a bi-directional, recirculating, three stage shift register. The description of this embodiment of the invention provides information from which anyone skilled in the art can make shift registers embodying the present invention having any number of stages and being capable of non-recirculating unidirectional operation, non-recirculating bi-directional or multi-directional operation, or unidirectional and multi-directional recirculating operation. Although in the embodiment shown no output means are illustrated, the manner in which any desired output can be effected will be described in such detail that no additional diagrammatic illustration is needed for an ample and clear disclosure.

The embodiment here described is a recirculating shift register, and therefore electrically it is an endless ring, notwithstanding the diagrammatic representation of the drawing, which appears on first blush to show a terminated straight line sequence. However, for the purpose of discussion, clarity is served by arbitrarily selecting one stage of the shift register as a starting point, or first stage, the next adjacent stage in one direction as the last or third stage and the other next adjacent stage as the intermediate or second stage. Hence, this discussion arbitrarily places the first stage at the top of the drawing, the third stage at the bottom of the drawing, and the second stage between them. Shifting from first to second to third stage will be called shifting "down," and shifting from third to second to first to third stages will be called shifting "up."

Since the stages of the shift register to be described are bistable, neither of the two conditions each stage may assume can be said to be inherently normal. However, for clarity of description and to facilitate discussion, the condition shown in the drawing will be called the "normal" condition and all contacts will be arbitrarily treated as being normally in the position shown in the drawing. This normal condition may also be called the "reset" or "deenergized" condition. The other of the two bistable conditions will, accordingly, be referred to as the "energized" or "set" conditions. Bear in mind, however, that these terms do not abstractly define structure, but they are merely a convention adopted for this disclosure, and insofar as they may be used in claims or applied to other embodiments they merely distinguish two sets of conditions one from another.

Referring now specifically to the drawing of the circuitry which is common to the entire shift register, a unidirectional current source 1, which is represented by the symbol for a battery, provides input and operating signals for the shift register, and it has its positive pole 2 connected to a motor bus 3. A shift up return bus 4 is connected through a shift up switch 5 to a negative pole 6 of the unidirectional source 1, and a shift down return bus 7 is connected through a shift down switch 8 to the negative pole 6 of the source 1. Finally, a motor input return bus 9 is connected directly to the negative pole 6 of the source 1.

Each of the stages of the shift register contains a relay module 100, 200 and 300, respectively, from top to bottom of the drawing. Inasmuch as each of the three stages and their relay modules are identical, one description will suffice for all. Accordingly, the first stage will be described and its reference numerals will all be in the 100 series. After each reference numeral for the first module, two reference numerals will appear in parentheses; the parenthetical reference numeral in the 200 series will refer to the identical structure in the second stage; and the parenthetical reference numeral in the 300 series will refer to the identical structure in the third stage.

The relay module 100 (200, 300) has a motor means 101 (201, 301) designed to provide a stepping rotational movement. The motor means 101 (201, 301) is comprised of an operating coil 102 (202, 302) which functions with a driving spring 103 (203, 303) to provide the motive force. The operating coil 102 (202, 302) and the driving spring 103 (203, 303) operate on a pawl 104 (204, 304) which engages the teeth of a ratchet wheel 105 (205, 305). When the operating coil 102 (202, 302) is energized it attracts the pawl 104 (204, 304) pulling it around the teeth of the ratchet wheel 105 (205, 305) and extending the driving spring 103 (203, 303). When the operating coil 102 (202, 302) is deenergized, releasing the pawl 104 (204, 304) the driving spring 103 (203, 303) pulls the pawl 104 (204, 304) to rotate the ratchet wheel 105 (205, 305) one notch.

The ratchet wheel 105 (205, 305) is mounted on a shaft represented by the dotted line 106 (206, 306) and this may be referred to as the drive shaft 106 (206, 306). Each module has a control device 107 (207, 307). The control device 107 (207, 307) is made up of a control cam 108 (208, 308) mounted on the drive shaft 106 (206, 306). The control cam 108 (208, 308) operates a single-pole-double-throw contact means 109 (209, 309), which is made up of a normally closed stationary contact 110 (210, 310), a normally open stationary contact 111 (211, 311) and a movable common contact 112 (212, 312). The movable common contact 112 (212, 312) has an extension functioning as a cam follower extension 113 (213, 313) which rides upon the control cam 108 (208, 308) so that the control cam 108 (208, 308) serves to actuate the contact means 109 (209, 309). The normally closed stationary contact 110 (210, 310) is connected through a set input switch 114 (214, 314) to the motor input return bus 9. The normally open stationary contact 111, (211, 311) is connected through a reset input switch 115 (215, 315) to the motor input return bus 9, and the movable common contact 112 (212, 312) is connected through a complement input switch 116 (216, 316) to the motor input return bus 9, and to the operating coil 102 (202, 302) of the motor means 101 (201, 301).

The first directional transfer means is a down transfer device 117 (217, 317) made up of a down transfer cam 118 (218, 318) and a cam operated down transfer contact means 119 (219, 313). The down transfer contact means 119 (219, 319) is made up of a single-pole-double-throw contact arrangement having a normally open stationary contact 120 (220, 320), a normally closed stationary contact 121 (221, 321) and a movable common contact 122 (222, 322). The movable common contact 122 (222, 322) has an extension serving as a cam follower 123 (223, 323) which rides on the down transfer cam 118 (218, 318) so that the down transfer contact means 119 (219, 319) are actuated by the down transfer cam 118 (218, 318). The movable common contact 122 (222, 322) is connected through a blocking diode 124 (224, 324) to the shift down bus 7, the blocking diode 124 (224, 324) serving to block or eliminate a potential spurious signal path.

The second directional shifting means is an up transfer device 125 (225, 325) which consists of an up transfer cam 126 (226, 326) and a cam operated, up transfer, single-pole-double-throw contact means 127 (227, 327). The up transfer contact means 127 (227, 327) is made up of a normally closed stationary contact 128 (228, 328), a normally open stationary contact 129 (229, 329) and a movable common contact 130 (230, 330). The movable common contact 130 (230, 330) has an extension serving as a cam follower 131 (231, 331) which rides upon the up transfer cam 126 (226, 326) to operate the up transfer contact means 127 (227, 327). Also, the movable contact 130 (230, 330) is connected through a blocking diode 132 (232, 332) to the shift up return bus 4.

When modules 100, 200 and 300 are connected together as shown in the drawing, they make up three stages of a bi-directional recirculating shift register. The shift down function is effected through the down transfer devices 117, 217 and 317. The normally open stationary contact 120 of the down transfer contacts 119 in the first module 100 is connected to the normally closed stationary contact 210 of the control contacts 209 in the second module 200, and the normally closed stationary contact 121 of the down transfer contacts 119 in the first module 100 is connected to the normally open stationary contact 211 of the control contacts 209 in the second module 200. Similarly, the normally open stationary contact 220 of the down transfer contacts 219 in the second module 200 is connected to the normally closed stationary contact 310 of the control contacts 309 of the third module 300, and the normally closed stationary contact 221 of the down transfer contacts 219 in the second module 200 is connected to the normally open stationary contact 311 of the control contacts 309 in the third module 300. In this same manner, the down transfer contacts 319 of the third module 300 are connected across the control contacts 109 of the first module 100 so that the normally open stationary contact 320 of the down transfer contacts 319 in the third module 300 is connected to the normally closed stationary contact 110 of the control contacts 109 of the first module 100 and the normally closed stationary contact 321 of the down transfer contacts 319 of the third module 300 is connected to the normally open contact 111 of the control contacts 109 of the first module 100.

The shift up operation is achieved through the up transfer devices 125, 225 and 325 connected in reverse direction as compared to connections of the down transfer devices 117, 217 and 317 described in the preceding paragraph. The up transfer contacts 127 of the first module 100 are connected across the control contacts 309 of the third module 300 so that the normally closed stationary contact 128 of the up transfer contacts 127 in the first module 100 is connected to the normally open stationary contact 311 of the control contacts 309 of the third module 300, and the normally open contact 129 of the up transfer contacts 127 of the first module 100 is connected to the normally closed contact 310 of the control contacts 309 of the third module 300. Likewise, the up transfer contacts 227 of the second module 200 are connected across the control contacts 109 of the first module 100 so that the normally closed stationary contact 228 of the up transfer contacts 227 is connected to the normally open contact 111 of the control contacts 109 of the first module, and the normally open contact 229 of the up transfer contacts 227 of the second module 200 is connected to the normally closed contact 110 of the control contacts 109 of the first module 100. And in the same manner the up transfer contacts 327 of the third module 300 are connected across the control contacts 209 of the second module 200 so that the normally closed contact 328 of the up transfer contacts 327 in the third module 300 is connected to the normally open contact 211 of the control contacts 209 of the second module 200, and the normally open contact 329 of the up transfer contacts 327 of the third module 300 is connected to the normally closed contact 210 of the control contacts 209 in the second module 200.

When the shift down switch 8 is closed, a current path is completed through the down transfer devices 117, 217 and 317 of the modules 100, 200 and 300, respectively, to the operating coils 102, 202 and 302, respectively, through their associated control contacts 109, 209 and 309, respectively. This current path through the down transfer contacts 119, 219 and 319 is always to the operating coil 102, 202 and 302 of the next downward succeeding module 200, 300 and 100. Hence, when the first module 100, for example, is energized and the shift down switch 8 is closed a circuit is completed to the operating coil 202 of the second module, also, when the the second module 200 is energized and the down contact switch 8 is closed, a current path is completed to the operating coil 302 of the third module 300, and when the third module 300 is energized and the shift down switch 8 is closed, a current path is completed to the operating coil 102 of the first module 100.

Similarly in the shift up operation, a circuit is completed through the up transfer contacts 127, 227 and 327 to the control contacts 109, 209 and 309 of the next upwardly preceding relay module 300, 200 and 100. Accordingly, when the second module 200 is energized and the shift up switch 5 is closed, a current path is completed through the up transfer contacts 227 of the second module 200 and the control contact means 109 of the first module 100 to the operating coil 102 of the first module 100. Also when the first module 100 is energized and the shift up switch 5 is closed, a current path is completed through the up transfer contacts 127 of the first module 100 and the control contact means 309 of the third module 300 to the operating coil 302 of the third module 300. Finally, when the third module 300 is energized and the shift up switch 5 is closed, a circuit is completed through the up transfer contact means 327 of the third module 300 and the operating contact means 209 of the second module 200 to the operating coil 202 of the second module 200.

In addition to the above described shifting function, information may also be inserted in, or cancelled from each relay module 100, 200 or 300 individually through the set input switches 114, 214 and 314, respectively, or the complement input switches 116, 216 and 316, respectively, or the reset input switches 115, 215 and 315, respectively. For example, if it is desired to energize the module 100 (200, 300) when it is in the normal, deenergized, or reset condition shown in the drawings, the set input switch 114 (214, 314) may be closed, completing a current path from the negative pole 6 of the current source 1 through the set input switch 114 (214, 314), the normally closed stationary contact 110 (210, 310), the movable common contact 112 (212, 312), the operating coil 102 (202, 302) of the module 100 (200, 300) and back through the motor input bus 3 to the positive pole 2 of the current source 1. Similarly, if the module 100 (200, 300) is in the condition shown in the drawings the complement input switch 116 (216, 316) may be closed again completing a current path through the operating coil 102, (202, 302) and the current source 1.

If the relay module 100 (200, 300) is in the reset condition shown in the drawing and the reset input switch 115 (215, 315) is closed there will be no change in the condition of the modules 100 (200, 300). However, if the modules 100 (200, 300) are in an energized or set condition so that the normally open contact 111 (211, 311) of the control contacts 109 (209, 309) is closed, and then the reset switch 115 (215, 315) is closed, a current path is created through the operating coil 102 (202, 302) to the current source 1. Also, if the modules 100 (200, 300) are in the set or energized condition and the complement input switch 116 (216, 316) is closed, a circuit for energizing current through the operating coil 102 (202, 302) will also be completed and the module 100 (200, 300) will shift to a reset or normal condition.

Although the stepping cam operated relay module is a commercially available component and has long been known to the art, it is important in the context of the present invention to review its operation. When a circuit is completed through the operating coil 102 (202, 302) and that coil is energized, it attracts its pawl 104 (204, 304) but nothing happens to the condition of the relay 100 (200, 300) so far as its contact means 109 (209, 309), 119 (219, 319) or 127 (227, 327) are concerned. Hence, the module 100 (200, 300) is unaffected by the leading edge of an input pulse. However, when a current path to the operating coil 102 (202, 302) is interrupted and the operating coil 102 (202, 302) is deenergized, then the driving spring 103 (203, 303) pulls the pawl 104 (204, 304) back, and inasmuch as the pawl 104 is engaged with the ratchet 105 (205, 305) in that direction, the ratchet 105 (205, 305) is rotated one step. When the ratchet 105 (205, 305) is rotated one step, the drive shaft 106 (206, 306) is also rotated one step, carrying with it the operating cam 108 (208, 308) and directional cams 118 (218, 318) and 126 (226, 326). Hence, the module 100 (200, 300) operates, that is, changes condition, on the trailing edge of the input signal.

On the basis of the foregoing description, the operation of the shift register and of the individual modules 100, 200 and 300 can be briefly summarized. If the set switch 114 (214, 314) is closed and opened to create an input pulse, the module 100 (200, 300) will remain in, or assume its set or energized condition. When the reset switch 115 (215, 315) is closed and reopened, the module 100 (200, 300) will either assume or remain in its reset condition. Finally, if the module 100 (200, 300) is in the set or energized condition and its complement input switch 116 (216, 316) is closed and opened, the module 100 (200, 300) will assume its reset or deenergized condition, but if the complement input switch 116 (216, 316) is once again opened and closed, when the module 100 (200, 300) is in its reset condition, the module 100 (200, 300) will change to its set or energized condition.

To summarize the shift down operation, if module 100 is energized and the down switch 8 is closed and opened, then the second module 200 becomes energized through the down transfer contacts 119 of the first module 100, and the first module 100 is deenergized by the signal passing through the down transfer contacts 319 of the third module 300. When the second module 200 is energized and the down switch 8 is closed and opened, the third module 300 becomes energized through the down transfer contacts 219 of the second module 200, and the second module 200 is deenergized through the down transfer contacts 119 of the first module 100. If the shift down switch 8 is closed and opened once again when the third module 300 is energized, then the first module 100 becomes energized through the down transfer contacts 319 of the third module 300, and the third module 300 is deenergized through the down transfer contacts 219 of the second module 200.

If the first module 100 is energized and the shift up switch 5 is closed, then the third module 300 becomes energized through the up transfer contacts 127 of the first module 100, and the first module 100 is deenergized through the up transfer contacts 227 of the second module 200. If the shift up switch 5 is closed when the third module 300 is energized, then the second module 200 becomes energized through the up transfer contacts 327 of the third module 300, and the third module 300 is deenergized through the up transfer contacts 127 of the first module 100.

In the event that both the first and second modules 100 and 200 are energized and the shift down switch 8 is closed and opened, the first module 100 is deenergized, the third module 300 becomes energized and the second module 200 remains energized, and the information is thus shifted one step down. If the second and third modules 200 and 300 are energized and the shift up switch 5 is closed and opened, then the third module 300 becomes deenergized and the first module 100 becomes energized along with the second module 200 which remains in its energized state and the information is thus shifted up one stage. If the first and second modules 100 and 200 are energized and both the shift up and shift down switches 5 and 8 are closed, then the third module 300 becomes energized and the first and second modules 100 and 200 are deenergized. If all three modules 100, 200 and 300 are energized, actuation of the shift switches 5 and 8 will have no effect on the shift register, just as they have no effect on the shift register if all of the modules 100, 200 and 300 are deenergized.

To make a unidirectional non-circulating shift register out of the embodiment shown, it is apparent that all one need do is eliminate one of the directional transfer means in each of the modules from the circuit and not tie the third module 300 back into the first module 100. By the same token if it is desired to add further directions for shifting information, it is only necessary to add one more directional means including a switching means and a cam means to each module, although conceivably more than one switchng means could be operated from one cam thus eliminating the need for additional cams. In short, to obtain a shift register having the capability of shifting information in N direction, one need have only $N+1$ contact means such as those shown in the embodiment here described, and preferably $N+1$ cams, although once again more than one contact means could be operated off one cam. To obtain an output it is only necessary to add another cam operated contact means connected to a source of output signal to each module where an output is desired.

The great flexibility and versatility of outputs available from a shift register of the present invention is among its cardinal features. The possibilities are all but infinite, and can be achieved by appropriately shaping the cams that actuate the transfer or the output contacts. For example, in an automatic loading operation if it were desired to put a dozen cans or bottles in a box, the transfer cams could be cut to actuate the transfer contacts for every twelve steps of the relay module, instead of actuating the transfer contacts on every step of the module as is shown in the embodiment of the drawings. Numerical operations and other sequencing operations of many types can be achieved by the proper shaping of cams and by adding the proper number of cams for each bit of information desired to be controlled. In addition, the advantages of asynchronous operation and the permanent memory of a shift register embodying the present invention are apparent.

Inasmuch as the stepping cam operated relay has long been commercially available and is not disclosed here as an invention, the precise form and structure of the device are not crtical and would probably vary from manufacturer to manufacturer. Similarly, it is apparent from the foregoing that actuation of the shift switches 5 and 8, as well as the set input switches 114, 214, 314, the complement input switches 116, 216 and 316 and the reset input switches 115, 215 and 315 in conjunction with the constant unidirectional source serves to produce a pulse input signal similar to a unidirectional square wave. Hence, substitution of a pulse input signal source for the constant source and switches shown is clearly suggested.

As has been stated, the invention is not limited to the embodiment of the drawings, nor is it limited to the several variations in that embodiment that have been mentioned here. Those are but illustrative examples of embodiments of the invention, and for the essence of the invention from which its manifold objects and advantages result, look to the following claims wherein that which is regarded as the invention is particularly pointed out and distinctly claimed.

I claim:

1. A shift register comprising the combination of
an electrical signal source;
and a plurality of stages connected in sequence;
each of said stages containing a stepping cam operated relay module with a motor means for actuating said module responsive to a signal from said electrical signal source, a cam operated control contact means driven by said motor means and adapted to connect said electrical signal source to said motor means, and a cam operated transfer contact means driven by said motor means and adapted to connect said electrical signal source to a control means of a sequentially adjacent stage.

2. A shift register containing a plurality of stages in sequence; each of said stages comprising the combination of
a least two rotary cams ganged for simultaneous stepping rotation;
an electro-mechanical motive source for imparting stepping rotary motion to said cams;
an electrical input signal source for energizing said motive source,
a cam follower on each of said cams;
a set of single-pole-double-throw contacts having a movable contact and two stationary contacts for each cam, said movable contact being connected to one of said cam followers to be actuated by its associated cam;
a first of said sets of contacts being connected in series between said electrical source and said motive source;
and a second of said sets of contacts being connected between said electrical source and said first set of contacts in a subsequent stage.

3. In a stage of a shift register, the combination comprising:
an electrical energizing source;
an electro-mechanical motor means connected to be energized by said electrical source and adapted to provide a mechanical stepping rotary motion;
a control cam and at least one transfer cam mounted to be driven by said motor means;
a set of control contacts connected in series with said electrical source and said motive source and having a moving contact engaging said control cam to be actuated thereby;
a set of transfer contacts adapted for connection to a sequentially adjacent stage of said shift register and having a moving contact engaging said transfer cam to be actuated thereby;

and a shift switch connecting said shift contacts to said electrical source.

4. A shift register comprising the combination of a plurality of stages connected in sequence, at least one of said stages having a plurality of cams mounted on a shaft;

an electro-mechanical motor means adapted to impart a stepwise rotary motion to said shaft by rotating said shaft one step on a trailing edge of an electrical input signal;

an electrical input signal source for energizing said motive source and having one pole connected to said motive source;

complement, set and reset input switches connected between said motive source and another pole of said electrical source;

cam operated control contacts including a cam member connected to be driven by said motive source and contact means adapted to alternately connect said set and reset switches to said motive source and to be actuated by said cam member;

and cam operated transfer contacts including a cam member connected to be driven by said motive source and contact means actuated by said cam member to connect said other pole of said electrical source to a sequentially adjacent stage.

5. A shift register made up of a plurality of sequentially connected stages, wherein each stage employs a stepping cam operated relay and is comprised of at least one transfer device having a cam;

a single-pole-double-throw contact means, and a cam follower riding on said cam and connected to actuate said contact means, said contact means having a normally open contact and a normally closed contact and a common contact;

a control means having a cam, a single-pole-double-throw contact means, and a cam follower riding on said cam and connected to actuate said contact means, said contact means having a normally open contact and a normally closed contact and a common contact;

a motor means having an operating coil connected to said common contact of said control means and being adapted to impart stepping rotational movement to said cams responsively to energization of said operating coil by an electrical pulse signal;

an electrical signal source connected to energize said operating coil with an electrical pulse signal through said stationary contacts and said common contact of said contact means in said control means;

and a shift switch connecting said common contact of said transfer means to an electrical signal source;

said normally open contact of said transfer means being connected to a normally closed contact of a control means in a next successive stage and said normally closed contacts of said transfer means being connected to a normally open contact of said control means in said next successive stage.

6. A multi-directional shift register comprising the combination of an electrical pulse signal source;

a plurality of stages;

each of said stages containing a stepping cam operated relay module having a motor means for actuating asid module responsive to a signal from said electrical pulse signal source, a cam operated control contact means driven by said motor means and adapted to connect said electrical pulse signal source to said motor means, and a plurality of cam operated transfer contact means driven by said motor means;

one of said transfer contact means connecting said electrical pulse signal source to a control contact means of a next adjacent stage in one direction, and another of said transfer contact means connecting said electrical pulse signal source to a control contact means of another next adjacent stage in another direction.

7. A shift register for shifting information in a plurality of directions comprising the combination of an electrical source;

a plurality of relay modules connected in succession;

each of said relay modules containing a motor means connected to be energized by said electrical source and adapted to provide stepwise rotary motion on the trailing edge of an electrical signal from said source, a plurality of rotary cams driven by said motor means, a plurality of single-pole-double-throw contact means associated with said cam and each having two fixed contacts and a movable common contact actuated by its associated cam to alternately contact one or the other of said fixed contacts; said module having at least one transfer contact means for transferring information in each direction and at least one control contact means for receiving information and energizing said motor means;

said control contact means of at least one of said modules having its fixed contacts connected to the fixed contacts of a transfer contact means both in a preceding module and a succeeding module, and its movable contact connected in series with said motor means;

and at least one of said transfer contact means of at least one of said modules being connected through a shift switch to said electrical source.

8. A recirculating shift register comprising the combination of an electrical pulse signal source;

a plurality of stages containing stepping cam operated relay modules;

each stepping cam operated relay module having a motor means for operating said module responsive to a signal from said electrical pulse signal source, a cam actuated control contact means operated by said motor means for connecting said electrical pulse signal source to said motor means, and a cam actuated transfer contact means operated by said motor means and connected to said electrical pulse signal source;

said stages being connected in an endless succession with said control contact means of each stage connected to receive a signal from said electrical pulse signal source through said transfer contact means of a next preceding stage.

References Cited

UNITED STATES PATENTS 2,346,869 4/1944 Poole ----------- 317—140 X

LEE T. HIX, *Primary Examiner.*

U.S. Cl. X.R.

317—140